United States Patent [19]
Sabatier et al.

[11] Patent Number: 6,081,481
[45] Date of Patent: Jun. 27, 2000

[54] METHOD FOR DETECTING BURIED OBJECTS BY MEASURING SEISMIC VIBRATIONS INDUCED BY ACOUSTICAL COUPLING WITH A REMOTE SOURCE OF SOUND

[75] Inventors: James M. Sabatier; Kenneth E. Gilbert, both of Oxford, Miss.

[73] Assignee: Institute for Technology Development, Jackson, Miss.

[21] Appl. No.: 07/042,564

[22] Filed: Apr. 17, 1987

[51] Int. Cl.$^7$ .............................. G03H 3/00; G01N 9/24; G01N 29/00
[52] U.S. Cl. .................................................. 367/8; 73/604
[58] Field of Search .......................... 367/8, 10; 73/604, 73/653, 657, 594; 356/345, 349, 354

[56] References Cited

U.S. PATENT DOCUMENTS 3,585,848   6/1971   Korpel ...................................... 73/604

OTHER PUBLICATIONS

"An Optical Hetrodyne Ultrasonic Image Converter," Massey, G.A., Proc. IEEE, Dec. 1968, p. 2157–2161.

*Primary Examiner*—Ian J. Lobo
*Attorney, Agent, or Firm*—Bacon & Thomas, PLLC

[57] ABSTRACT

A method for detecting the seismic discontinuity in acoustic impedance caused by an acoustically hard, reflective object buried a few feet below poroelastic soil using seismic activity induced through acoustic coupling with a remote sound source. The abrupt change in the soil impedance caused by the buried object causes sound to reflect between the object and the surface and increase the amplitude of the seismic vibrations induced by the incident acoustic energy. The change in the seismic displacement of the soil is on the order of angstroms which can be detected using remote optical test equipment such as a laser-doppler vibrometer (LDV) commonly used in nondestructive testing. A sound source emits sound at frequencies that induce significant seismic coupling with the poroelastic soil. Part of a beam of laser light of an LDV is scanned over the ground. The laser light is shifted in frequency from its source frequency by an amount intended to approximate the frequency of the anticipated seismic vibrations. The seismic vibrations of the soil frequency modulate the laser light to form upper and lower side bands. The amplitude of the side bands increases in the presence of an acoustically hard object due to the greater seismic vibrations over the acoustically reflecting surface. Laser light that is scattered back is combined with unshifted laser light in the photodetector of the LDV so as to eliminate the optical frequency effects of the laser and to cause the carrier frequency and side bands to emerge as distinct signals.

5 Claims, 1 Drawing Sheet

METHOD FOR DETECTING BURIED OBJECTS BY MEASURING SEISMIC VIBRATIONS INDUCED BY ACOUSTICAL COUPLING WITH A REMOTE SOURCE OF SOUND

BACKGROUND OF THE INVENTION

1. Field of the Invention

The present invention relates to a method for the remote detection of buried objects.

2. Description of Related Art

Studies have shown that acoustical energy in air will interact with poroelastic soil to induce seismic activity in the soil. See, for example, Sabatier et al, *Acoustically Induced Seismic Waves*, J. Acoust. Soc. Am. (August, 1986), and Attenborough et al, *The Acoustic Transfer Function at the Surface of a Layered Poroelastic Soil*, J. Acoust. Soc. Am. (May, 1986), both references being incorporated herein by reference. The first few tens of centimeters of the surface of ground typically become porous because of natural weathering phenomenon, involving such processes as the growth of roots of vegetation. The pores in the soil permit the ground to transmit acoustic energy. Theoretical calculations and experimental measurements agree that sound that is incident to the ground propagates in the 20 pores of the soil. See, Sabatier et al, *The Interaction of Airborne Sound with the Porous Ground: the Theoretical Formulation*, J. Acoust. Soc. Am. (May, 1986), incorporated herein by reference. The speed of propagation of the acoustic wave in the porous soil, however, is typically only a few tens of meters per second which is much less than the speed of sound in air. Consequently, the direction of acoustic propagation in poroelastic soil is highly refracted toward the normal of the surface of the ground even when the sound arrives at grazing angles of incidence.

The acoustic energy in the pores of the soil is highly attenuated through viscous drag at the walls of each pore. The acoustic energy is transferred into seismic energy in the form of motion of the soil particles. The precise interaction of the ground with acoustical energy depends on the specific composition of the soil. Ordinary porous soil produces a normalized acoustic surface impedance in the range of a few to a few tens of ρc units in the frequency range of 20 Hz–2 kHz.

SUMMARY OF THE INVENTION

It has been discovered that an acoustically reflecting, nonporous object that is buried a few centimeters to a few feet below a porous surface creates a discontinuity in the acoustical impedance of the soil that can be detected by a remote sensing means. The abrupt change in the soil impedance causes 1) sound to reflect back from the object into the air, and 2) sound to reflect between the object and the surface. This second phenomenon significantly increases the amplitude of the seismic vibrations induced by the incident acoustic energy. The change in the seismic displacement of the soil is on the order of angstroms which can be detected using remote optical test equipment such as a laser-doppler vibrometer (LDV) commonly used in nondestructive testing.

In the preferred embodiment, a sound source such as a speaker or source generates acoustic energy in the form of a frequency sweep or "chirp", or a broad band, multifrequency, "white noise" signal. Alternately, the sound source could be a general purpose mechanical device such as, perhaps, the rotors of a helicopter. The acoustical energy from the sound source has a frequency that induces significant seismic coupling with the poroelastic soil. Part of a beam of laser light of an LDV is scanned over the ground. The laser light is shifted in frequency from its source frequency by an amount intended to approximate the frequency of the anticipated seismic vibrations. The seismic vibrations of the soil frequency modulate the laser light to form upper and lower side bands. The amplitude of the side bands increases in the presence of an acoustically hard object due to the greater seismic vibrations over the acoustically reflecting surface. Laser light that is scattered back is combined with unshifted laser light in the photodetector of the LDV so as to eliminate the optical frequency effects of the laser and to cause the carrier frequency and side bands to emerge as distinct signals. The presence of a buried object, such as a mine, is detected by the increase in the amplitude of the side bands.

DETAILED DESCRIPTION OF THE PREFERRED EMBODIMENT

Figure 1:
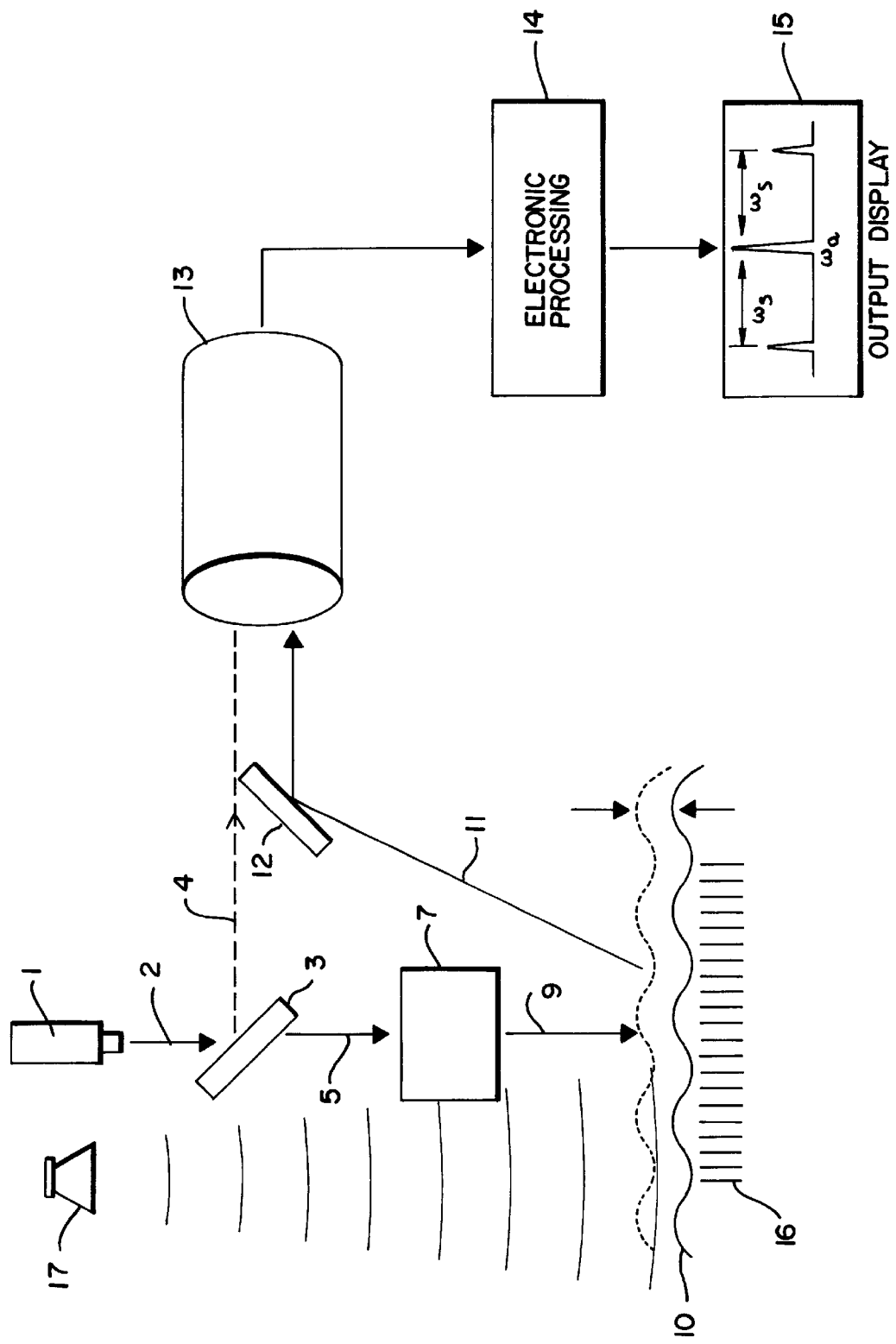
FIG. 1 is a block diagram of the apparatus for carrying out the process according to the present invention.

Referring to FIG. 1, a laser 1 emits a beam of radiant energy 2 having a frequency $w_o$. A refractive beam splitter 3 divides the radiant energy into a reference beam 4 and a target beam 5. An acoustic/optic modulation unit 7, typically a Bragg cell, displaces the frequency of the laser light by adding or subtracting a carrier frequency component $w_a$ corresponding in magnitude to the anticipated frequency of the seismic oscillations of the poroelastic soil. A beam of radiant energy 9 from the acoustic/optic modulation unit reflects off the ground 10.

Back scattered laser light 11 is reflected by scanning mirror 12 to photodetector 13. The back scattered light combines with the reference beam in the photodetector to produce an interference pattern. Any change in the ground, such as caused by a seismic disturbance, for example such as might be set up by the sonic energy described below, changes the interference pattern and, consequently, the output of the photodetector. Processing electronics 14 eliminate the carrier frequency $w_o$ from the output of the photodetector so that only the modulation carrier frequency $w_a$ and the seismic vibrations are present. The seismic vibrations appear as side bands at $\pm w_s$ about the carrier frequency $w_a$.

It has been found that the amplitude of the seismic vibrations induced by incident acoustic energy increases in the presence of an acoustically hard object 16. The hard object reflects seismic and acoustic energy from sound source 17 back to the surface of the ground rather than permitting the energy to damp out through friction with deeper layers of soil. Experiments have shown that the increased amplitude of seismic vibrations is 3 to 20 times greater than corresponding vibrations induced in soil with a semiinfinite acoustical depth. Thus, the presence of an acoustically hard, reflecting object below the ground can be readily detected.

The preferred embodiment of the present invention uses the optical apparatus shown in FIG. 1 to measure the increase in seismic vibrations caused by the presence of a hard, reflecting object. The incident beam of laser light has a frequency $w_o + w_a$ when it impinges on the surface 10 which vibrates at frequency $w_s$ in a manner approximated by a modified form of the Biot-Stoll differential equations for wave propagation in porous media. The Biot-Stoll model for poroelastic soil is known in the art and is therefore not explained here. Assume that the displacement of the surface S(t) is given by $$S(t) = a \sin(w_s t) \quad (1)$$

where a is the amplitude of displacement. The electric field in the scattered beam of radiant energy 11 may be expressed as $$E_{scat} = A \cos[(w_o + w_a)t + \phi]; \quad (2)$$

where:
$\phi = 2\, kS(t)$;
$k = 2\, pi/wavelength$; and
A=the amplitude of the scattered laser light correspondings to the product of the amplitude of the incident light and the reflection coefficient of the surface.

Assuming that the amplitude of the reflected beam is sufficiently large, the reflected light from mirror 12 mixes with the reference beam from beam splitter 3 in photodetector 13. The output current of the photodetector may be expressed as $$I_{out} = <A \cos |\{[(w_o+w_a)t+\phi] + \cos w_o t\}|^2>; \quad (3)$$

where:
< > denotes the time average of the signal imposed by the LDV.
Subtracting the DC base line current leaves:

$$I_{out} = <2A \cos[(w_o+w_a)t+\phi]\cos w_o T> = A<\cos[(2w_o+w_a)t+\phi] + \cos(w_a t+\phi)>. \quad (4)$$

Since the detector does not respond at optical frequencies, the output current is $$I_{out} = A \cos(w_a t + \phi). \quad (5)$$

Assuming that $\phi = 2\, kS(t) << 1$, then $$I_{out} = A \cos(w_a t) + ka[\cos(w_a + w_s)t + \cos(w_a - w_s)t]. \quad (6)$$

Thus, the output signal has a carrier wave of amplitude A and frequency $w_a$, and two side bands with amplitude ka and frequency $w_a \pm w_s$.

The device described above uses phase modulation to measure the vibrational amplitude of the seismic waves which the acoustical impulses induce in the poroelastic soil. An alternate method involves frequency modulation. The output of the photodetector would then be proportional to the velocity of the surface. Yet another method would be to detect acoustic waves reflected from the object into the air. Pure acoustic detection, however, is not preferred.

The apparatus of the present invention may be deployed on a tower so as to enable surveying a wide area without platform motion interfering with the seismic signal. It is to be appreciated that the sound may impact on the surface at large angles relative to the normal surface. The high refractive index of impedance ground refracts the sound almost normal to the surface so as to induce comparable seismic vibrations. Alternately, the apparatus may be mounted on an airplane. Influences due to motion of the airplane relative to the ground may be eliminated by using multiple reference beams directed against different parts of the ground and then removing platform motion by removing all correlated events.

Buried objects can be discerned by their relative size as measured by the scanning mechanism. The smallest spot recognized by the scanning mechanism should correlate to the smallest size object that the incident acoustical energy can discern. The minimum discernible object is determined by the relative strength of the sound in the soil above the object. Smaller objects require more signal from the sound source to induce a detectable increase in seismic vibrations.

Low frequency sound is preferred because it is better at penetrating soil. Experiments indicate that soil is most easily coupled to acoustical energy when the frequency of the acoustical energy is in the range of 20–150 Hz. The sound source 17 in FIG. 1 may comprise any source of acoustical energy such as a horn or a piece of machinery such as, perhaps, the rotors of a helicopter. The acoustical energy may comprise a frequency chirp or a broad band, white noise signal. The analyzing apparatus may comprise any of several LDV systems. For example, the Vidispec electronic speckle pattern interferometer manufactured by Ealing Electro-Optics p.l.c. of Wattford, England may be used with a high-powered laser. Tests have been conducted using an LDA-05 noncontact vibration measuring system made by the Disa Corporation of Denmark together with a system 600, model 175 imaging system manufactured by $I^2S$ Corporation of California, or a model 1780P photodiode manufactured by the Oriel Corporation of Connecticut, or a model LBS 5020 Galvonometeric scanner manufactured by Laser Scanning Products, Inc. of Illinois. Many other known types of LDV equipment could also be used.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the invention. Accordingly, the foregoing detailed description should be considered exemplary in nature and not as limiting to the scope and spirit of the invention set forth in the appended claims.

What is claimed is:

1. A method of detecting an object buried under a few feet of soil, comprising the steps of:
   generating acoustic energy from a sound source;
   directing said acoustic energy to poroelastic soil, the poroelastic soil having acoustic impedance, said acoustic energy having a frequency range such that the acoustic energy couples with the poroelastic soil to set up seismic vibrations therein, said seismic vibrations having an amplitude that is related to the composition of the poroelastic soil;
   scanning the poroelastic soil so as to detect local differences in the acoustic impedance of the poroelastic soil; and
   measuring said local differences in acoustic impedance to localize said buried object.

2. A method of detecting a buried object as claimed in claim 1, further comprising the steps of:
   optically scanning the poroelastic soil with a beam of laser light; and
   optically collecting laser light that is back scattered from the poroelastic soil.

3. A method of detecting a buried object as claimed in claim 2, further comprising the step of measuring local changes in said amplitude of said seismic vibrations.

4. A method of detecting a buried object as claimed in claim 3, wherein the step of measuring local changes in amplitude of said seismic vibrations comprises the steps of:
   dividing a beam of said laser light into first and second beams;

directing said first beam of said laser light to a frequency change unit, said frequency change unit changing the frequency of the laser light by an amount that approximates the magnitude of the seismic vibrations anticipated from the poroelastic soil;

combining said back scattered laser light with said second beam of laser light to form an interference pattern, said second beam of laser light not being shifted in frequency;

electronically processing said interference pattern to separate a seismic component corresponding to said seismic vibrations from said optical interference pattern; and measuring the amplitude of said seismic component.

5. A method of detecting a buried object as claimed in claim 1, wherein said acoustic energy has a frequency between 20 Hz and 150 Hz.

* * * * *

UNITED STATES PATENT AND TRADEMARK OFFICE
CERTIFICATE OF CORRECTION

| | | |
|---|---|---|
| PATENT NO. | : 6,081,481 | Page 1 of 1 |
| APPLICATION NO. | : 07/042564 | |
| DATED | : June 27, 2000 | |
| INVENTOR(S) | : Sabatier et al. | |

It is certified that error appears in the above-identified patent and that said Letters Patent is hereby corrected as shown below:

Column 1,
Line 6, insert the following:
-- STATEMENT REGARDING FEDERALY SPONSORED RESEARCH AND DEVELOPMENT: This invention was made with Government support under DAAL03-87-K-0058 awarded by the United States Army Research Office. The Government has certain rights in the invention. --.

Signed and Sealed this

Twentieth Day of June, 2006

JON W. DUDAS
*Director of the United States Patent and Trademark Office*